United States Patent [19]

Matz

[11] Patent Number: 5,241,045
[45] Date of Patent: Aug. 31, 1993

[54] PROCESS FOR THE PRECIPITATION OF AQUEOUS PLASTICS DISPERSIONS CONTAINING POLYVINYL ALCOHOL

[75] Inventor: Volker Matz, Frankfurt am Main, Fed. Rep. of Germany

[73] Assignee: Hoechst Aktiengesellschaft, Fed. Rep. of Germany

[21] Appl. No.: 991,874

[22] Filed: Dec. 16, 1992

[30] Foreign Application Priority Data

Dec. 18, 1991 [DE] Fed. Rep. of Germany ....... 4141777

[51] Int. Cl.$^5$ .............................. C08J 3/14; C02F 1/52
[52] U.S. Cl. .................... 528/485; 528/489; 528/490; 528/491; 210/724; 210/725; 210/726; 210/727; 210/735
[58] Field of Search ............... 210/724, 725, 726, 727, 210/735, 723; 528/485, 489, 490, 491

[56] References Cited

U.S. PATENT DOCUMENTS

| | | |
|---|---|---|
| 4,066,541 | 1/1978 | Sando et al. ................... 210/724 |
| 4,078,129 | 3/1978 | Yamagata et al. ............... 210/723 |
| 4,166,033 | 8/1979 | Zimmermann et al. ........... 210/724 |
| 5,026,485 | 6/1991 | Anderson . | 
| 5,110,481 | 5/1992 | Sando et al. ................... 210/724 |

FOREIGN PATENT DOCUMENTS 0376605 7/1990 European Pat. Off. .

0041456 3/1977 Japan ................... 210/724

OTHER PUBLICATIONS

Copy of European Search Report (3 pages).
Copy of Derwent Article (2 pages) No. 77-85749Y.
Copy of Derwent Article (1 page) No. 77-13589Y.

Primary Examiner—Paul R. Michl
Assistant Examiner—Peter Szekely
Attorney, Agent, or Firm—Bierman and Muserlian

[57] ABSTRACT

A process for the precipitation of aqueous plastics dispersions containing polyvinyl alcohol, preferably from waste waters, and separation of the polymeric solids content, which comprises adding the following to the dispersion in order, with thorough mixing:

a) a boric acid component,
b) a basic compound for making the pH alkaline, then
c) an iron salt and
d) a cationic polymeric polyelectrolyte, and isolating the precipitate which forms in the alkaline medium. The process according to the invention is advantageously applicable in all relevant sectors of technology and waste water treatment in which polymer dispersions containing polyvinyl alcohol are used or have to be disposed of, and where waste waters in which dispersions containing polyvinyl alcohol are present have to be processed. Degrees of clarification of more than 95% can be achieved.

7 Claims, No Drawings

PROCESS FOR THE PRECIPITATION OF AQUEOUS PLASTICS DISPERSIONS CONTAINING POLYVINYL ALCOHOL

The invention relates to a process by which both the polyvinyl alcohol (PVAL) and the polymeric dispersant can be precipitated in a single operation from aqueous plastics dispersions containing polyvinyl alcohol.

Polymer dispersions containing PVAL and also, if appropriate, cellulose ethers as protective colloids can form exceptionally stable disperse systems which are known to be difficult to degrade in biological sewage treatment plants. Legal conditions in the Federal Republic of Germany stipulate that such dispersions must not be disposed of via the waste water. It is therefore necessary to coagulate the dispersions in a suitable way, e.g. by a physicochemical method, and preferably to precipitate the troublesome organic compounds in solid form and remove them from the aqueous phase.

A process according to Japanese patent application 85-150880, for the purification of latex-containing waste waters by precipitation of the latex with iron(III) and alkaline earth metal salts, is described in CA 103(24): 200429d. However, application of this method is not automatically satisfactory in the case of PVAL-stabilized plastics dispersions.

PVAL can be separated from aqueous solutions by various methods. Thus U.S. Pat. No. 4,166,033 describes both the precipitation of PVAL by means of iron or aluminum salts and the formation of a PVAL/boric acid complex and its precipitation as a sparingly soluble calcium salt. Japanese patent application 77-141060 describes a process in which PVAL is precipitated at pH values above 8 by the addition of water-soluble borates and sulfates. In the case of dispersions, however, this method only achieves incomplete coprecipitation of the dispersed plastic. If the PVAL is already present in the preparation of the dispersion during the polymerization reaction, e.g. as a protective colloid, graft polymers with PVAL as the grafting base are frequently also formed and these cannot generally be precipitated by the above PVAL precipitation methods.

The object of the present invention was therefore to develop a method by which both the PVAL and the whole of the dispersant can be completely precipitated in a single operation from aqueous plastics dispersions containing PVAL. This object can be achieved according to the invention by a process in which the following are added to the dispersion in order, with thorough mixing: first boric acid or a boric acid compound, then a basic compound, then a water-soluble iron salt and finally a cationic polyelectrolyte. After addition of the iron salt, the dispersed organic compounds start to precipitate out; after mixing with the cationic polyelectrolyte, they settle out completely in a readily filterable solid form and can easily be separated off for further utilization or disposal.

The invention therefore relates to a process for the precipitation of aqueous plastics dispersions containing polyvinyl alcohol and separation of the polymeric solids content, which comprises adding the following to the dispersion in order, with thorough mixing:
a) a boric acid component,
b) a basic compound for making the pH alkaline, then
c) an iron salt and
d) a cationic polyelectrolyte,
dispersing the precipitate which forms in the alkaline medium, by stirring, then stopping the stirrer, leaving the precipitate to settle out and isolating the sediment.

This method makes it possible to achieve practically complete precipitation of the whole of the PVAL and the dispersed organic compounds. The chemical oxygen demand (COD) of the filtrate obtained after the precipitation is less than 5% of the COD of the starting dispersion, corresponding to a degree of clarification of the aqueous phase of more than 95%. Another waste water criterion is the proportion of organically bonded carbon (DOC) dissolved therein. Here too, it is possible to achieve a reduction in the DOC value of more than 95% compared with the starting dispersion. Furthermore, the biological oxygen demand ($BOD_5$) of the filtrate is reduced by more than 80% compared with the starting dispersion.

The quotient of the analytical values of the biological and chemical oxygen demands ($BOD_5/COD$), which is generally less than 1, can have a theoretical maximum value of 1 and is 0.7 for compounds of good biodegradability, is known to be a measure of the biodegradability of the impurities contained in waste waters. The closer the value is to 0.7, the more completely can the impurities be removed by a biological sewage treatment process. Surprisingly, it has now been found that the process according to the invention affords a marked increase in this waste water parameter, e.g. by a factor of four in the case of a filtrate according to the invention, compared with the starting dispersion.

This means that the residual contamination in the waste water precipitated and filtered according to the invention, which is already low anyway, is also degradable to a substantially greater extent in a biological sewage treatment plant, compared with waste water containing the starting dispersion. Another surprising feature here is that the improved biodegradability of the waste water obtained after the precipitation and filtration according to the invention can be achieved despite the use of an inherently biocidal boric acid compound as a precipitating component.

The process according to the invention is used for the processing of dispersions in a manner suitable for the waste water, especially the processing of waste waters containing dispersions which are subject to compulsory disposal, said waste waters containing preferably 0.1 to 10% by weight and particularly preferably 0.2 to 2% by weight of a dispersant, preferably an organic dispersant. Possible dispersants are preferably vinyl ester polymers, especially polyvinyl acetate or polyvinyl propionate, or vinyl ester copolymers, especially vinyl acetate/ethylene copolymers. In PVAL-stabilized polymer dispersions, the proportion of PVAL is preferably 1 to 12% by weight, especially 3 to 10% by weight, based on the organic dispersant. The molecular weight and/or the degree of saponification of the PVAL do not generally constitute critical quantities here, although it is known that partially saponified PVALs are preferably used as protective colloids in plastics dispersions.

The boric acid components used are preferably boric acid and borates, e.g. borax or alkali metal borates. It is preferable to use 2 to 20% by weight, especially 5 to 10% by weight, of boric acid component, based on the solids content of the dispersion to be precipitated. The boric acid component is preferably used as an aqueous solution.

The basic compounds used are preferably inorganic basic compounds, especially alkali metal and alkaline earth metal hydroxides. These are preferably used in the form of aqueous solutions. It is particularly preferable to use a 20% by weight aqueous suspension of calcium hydroxide (milk of lime).

The water-soluble iron salts used are preferably iron-(III) salts and iron(II) compounds, especially iron(III) chloride, iron(III)sulfate, iron(II) sulfate and iron(II) chloride. The salts are preferably used as aqueous solutions. The amount of Fe salt used is preferably 2 to 20% by weight, especially 5 to 10% by weight, based on the solids content of the dispersion to be precipitated.

According to the invention, the complete precipitation of the dispersion constituents to be removed, in a solid form which settles out well and is readily filterable, requires the addition of a cationic polyelectrolyte. Possible cationic polyelectrolytes according to the invention are preferably cationic polymers. It is particularly preferable to use polydiallyldimethylammonium chloride (poly-DADMAC). The precipitation is preferably carried out using 0.1 to 3% by weight, especially 1 to 2% by weight, of cationic polyelectrolyte, based on the solids content of the dispersion to be precipitated. The polyelectrolyte is preferably used as an aqueous solution.

According to the invention, the weight ratio of boric acid component to iron salt in the precipitating reagents to be used is preferably 10:1 to 1:10. Furthermore, the weight ratio of the sum of the amounts of boric acid component and iron salt to the cationic polyelectrolyte is preferably 1:0.5 to 1:0.05, especially 1:0.1.

The process according to the invention is advantageously applicable in all relevant sectors of technology and waste water treatment in which polymer dispersions containing PVAL are used or have to be disposed of, and where waste waters in which dispersions containing PVAL are present have to be processed.

The invention is illustrated in greater detail by the following Examples.

EXAMPLES

General Working Instructions for Precipitation of the Dispersion

The boric acid component is added, with stirring, to the dispersion to be precipitated. The pH is then adjusted to 12.3 by the addition of base. Partial coagulation of the dispersion occurs at this pH. An iron salt solution is metered in slowly, with stirring (200 rpm, blade stirrer), the pH not being allowed to drop below 9.5. If appropriate, the pH is adjusted by the further addition of base. The cationic polyelectrolyte is then metered in. The densely flocculent precipitate which initially forms is dispersed by further intense stirring for about 10 minutes so as to give a moderately flocculent precipitate which permits optimal precipitation and settles out rapidly after the stirrer has been stopped. A clear decantate is obtained and the precipitate can easily be separated off in solid form on a paper filter and, like the decantate and the filtrate, can be passed on for subsequent disposal. The precipitate can preferably also be separated off by centrifugation and recovered in solid form. More highly concentrated dispersions are diluted with water, if appropriate, preferably before the precipitation treatment.

EXAMPLE 1

10 l of a 2% by weight polyvinyl acetate (PVAc) dispersion (solids content 200 g), stabilized with 5% by weight of polyvinyl alcohol, based on the dispersant, are mixed with 300 g of a 3% by weight aqueous boric acid solution. The pH is adjusted to 12.3 by addition of the requisite amount of a 20% by weight aqueous calcium hydroxide suspension, hereafter called milk of lime. 100 g of a 20% by weight aqueous iron(III) sulfate solution are metered in, with stirring (200 rpm, blade stirrer), so that the pH does not drop below 9.5. If appropriate, the pH is adjusted by the further addition of milk of lime. 10 ml of a 10% by weight aqueous poly-DADMAC solution are then added. The densely flocculent precipitate which forms is dispersed by further stirring for about 10 minutes, after which the stirrer is stopped and the mixture left to settle. A clear decantate is obtained after sedimentation. The precipitate is filtered off on a paper filter and isolated. The filtrate is combined with the decantate and is referred to as filtrate hereafter. The degree of clarification of the precipitation, which is calculated by the formula $$\left[ 100 - \frac{COD \text{ (filtrate)}}{COD \text{ (starting dispersion)}} \times 100 \; (=\%) \right],$$

is 97%.

The waste water analyses of starting dispersion and filtrate, performed by conventional methods, give the following values:

|  | COD mg $O_2$/l | BOD$_5$ mg $O_2$/l | BOD$_5$/COD | DOC mg C/l |
|---|---|---|---|---|
| 2% by weight PVAc dispersion | 32,400 |  |  | 11,200 |
| Filtrate of Example 1 | 850 |  |  | 345 |

EXAMPLE 2

10 l of a 2% by weight polyvinyl acetate (PVAc) dispersion (solids content 200 g), stabilized with 10% by weight of polyvinyl alcohol, based on the dispersant, are mixed with 700 g of a 3% by weight aqueous boric acid solution. The pH is adjusted to 12.3 by the addition of milk of lime. 100 g of a 20% by weight aqueous iron(III) chloride solution are metered in, with stirring (200 rpm, blade stirrer), so that the pH does not drop below 9.5. If appropriate, the pH is adjusted by the further addition of milk of lime. 25 ml of a 10% by weight aqueous poly-DADMAC solution are then added. The densely flocculent precipitate which forms is dispersed by intense stirring for about 10 minutes, after which the stirrer is stopped and the mixture left to settle. A clear decantate is obtained after sedimentation. The precipitate is filtered off on a paper filter and isolated. The decantate and filtrate are combined and are referred to as filtrate hereafter. The degree of clarification of the precipitation is 97%. The analyses of the starting dispersion and the filtrate, performed analogously to Example 1, give the following values:

|  | COD mg $O_2$/l | BOD$_5$ mg $O_2$/l | BOD$_5$/COD | DOC mg C/l |
|---|---|---|---|---|
| 2% by weight PVAc dispersion | 32,400 | 475 | $1 \cdot 10^{-2}$ | 10,540 |
| Filtrate | 820 | 50 | $6 \cdot 10^{-2}$ | 526 |

EXAMPLE 3

10 l of a 2% by weight polyvinyl acetate (PVAc) dispersion (solids content 200 g), prepared by the dilution of a commercially available dispersion with demineralized water and stabilized with 6% by weight of polyvinyl alcohol, based on the dispersant, are mixed with 400 g of a 3% by weight aqueous boric acid solution.

The pH is adjusted to 12.3 by the addition of milk of lime. 50 g of a 20% by weight aqueous iron(III) sulfate solution are metered in, with stirring (200 rpm, blade stirrer), so that the pH does not drop below 9.5. If appropriate, the pH is adjusted by the further addition of milk of lime. 10 ml of a 10% by weight aqueous poly-DADMAC solution are then added. The densely flocculent precipitate which forms is dispersed by intense stirring for about 10 minutes, after which the stirrer is stopped and the mixture left to settle. A clear decantate is obtained after sedimentation. The precipitate is filtered off on a paper filter and isolated. The decantate and filtrate are combined and are referred to as filtrate hereafter. The degree of clarification of the precipitation is 97%.

EXAMPLE 4

Example 3 is repeated except that 50 g of a 20% by weight aqueous iron(III) chloride solution are added instead of 100 g of a 20% by weight aqueous iron(III) sulfate solution. The degree of clarification of the precipitation is 96%.

EXAMPLE 5

Example 3 is repeated except that 50 g of a 10% by weight aqueous iron(II) sulfate solution are used instead of 100 g of a 20% by weight aqueous iron(III) sulfate solution. The degree of clarification is 98%.

The waste water analyses of Examples 3 to 5 give the following results:

|  | COD mg $O_2$/l | $BOD_5$ mg $O_2$/l | $BOD_5$/COD | DOC mg C/l |
|---|---|---|---|---|
| Commercially available PVAL-stabilized PVAc dispersion diluted to 2% by weight of solids | 35,000 | 2,000 | $6 \cdot 10^{-2}$ | 10,975 |
| Filtrate of Example 3 | 920 | 330 | $36 \cdot 10^{-2}$ | 296 |
| Filtrate of Example 4 | 810 | 200 | $25 \cdot 10^{-2}$ | 346 |
| Filtrate of Example 5 | 1,210 | 315 | $26 \cdot 10^{-2}$ | 386 |

EXAMPLE 6

1 l of a 0.2% by weight polyvinyl acetate dispersion (solids content 2 g), stabilized with 8% by weight of polyvinyl alcohol, based on the dispersant, is mixed with 4 g of a 3% by weight aqueous boric acid solution. The pH is adjusted to 12.3 by the addition of milk of lime. 1 g of a 20% by weight aqueous iron(III) sulfate solution is metered in, with stirring (200 rpm, blade stirrer), so that the pH does not drop below 9.5. If appropriate, the pH is adjusted by the further addition of milk of lime. 0.1 ml of a 10% by weight aqueous poly-DADMAC solution is then added and the mixture is stirred for 10 minutes. The precipitate which forms settles out slowly after the stirrer has been stopped and a clear decantate is obtained. The degree of clarification of the precipitation is 98%.

EXAMPLE 7

2 l of a 10% by weight polyvinyl acetate (PVAc) dispersion (solids content 200 g), stabilized with 10% by weight of polyvinyl alcohol, based on the dispersant, are mixed with 600 g of a 3% by weight aqueous boric acid solution. The pH is adjusted to 12.3 by the addition of milk of lime. 40 g of a 20% by weight aqueous iron(III) sulfate solution are metered in, with stirring (200 rpm, blade stirrer), so that the pH does not drop below 9.5. If appropriate, the pH is adjusted by the further addition of milk of lime. 8 ml of a 10% by weight aqueous poly-DADMAC solution are then added and the mixture is stirred intensely for 10 minutes. The gel which forms only settles out slowly. However, a flocculent solid precipitate which settles out well is obtained after 5-fold dilution of the precipitation mixture with water, followed by further intense stirring for 10 minutes. The degree of clarification in the latter variant with 5-fold dilution is 98%.

EXAMPLE 8

10 l of a 2% by weight vinyl acetate/ethylene copolymer dispersion (solids content 200 g), stabilized with 6% by weight of polyvinyl alcohol, based on the dispersant, are mixed with 600 g cf a 3% by weight aqueous boric acid solution. The pH is adjusted to 12.3 by the addition of milk of lime. 100 g of a 20% by weight aqueous iron(III) chloride solution are metered in, with stirring (200 rpm, blade stirrer), so that the pH does not drop below 9.5. If appropriate, the pH is adjusted by the further addition of milk of lime. 20 ml of a 10% by weight aqueous poly-DADMAC solution are then added. The densely flocculent precipitate which forms is dispersed by intense stirring for about 10 minutes, after which the stirrer is stopped and the mixture left to settle. A clear decantate is obtained after sedimentation. The precipitate is filtered off on a paper filter and isolated. The degree of clarification of the precipitation is 97%.

I claim:

1. A process for the precipitation of aqueous plastics dispersions containing polyvinyl alcohol and separation of the polymeric solids content, which comprises adding the following to the dispersion in order, with thorough mixing:

a) a boric acid component,
    b) a basic compound for making the pH alkaline, then
    c) an iron salt and
    d) a cationic polyelectrolyte, dispersing the precipitate which forms in the alkaline medium, by stirring, then stopping the stirrer, leaving the precipitate to settle out and isolating the sediment.

2. The process as claimed in claim 1, wherein the solids concentration of the dispersion to be precipitated is 0.1 to 10% by weight, based on the dispersion.

3. The process as claimed in claim 1, wherein the dispersion contains a vinyl ester polymer or vinyl ester copolymer as a dispersant.

4. The process as claimed in claim 1, wherein the pH of the dispersion after the addition of the basic compound b) is between 9.5 and 13.

5. The process as claimed in claim 1, wherein the weight ratio of the boric acid component a) to the iron salt c) is 10:1 to 1:10 and the weight ratio of the sum of the amounts of boric acid component a) and iron salt c) to the cationic polyelectrolyte d) is 1:0.5 to 1:0.05.

6. The process as claimed in claim 1, wherein the components a), c) and d) of the dispersion to be precipitated, used for precipitation of the dispersion, are added in the following amounts:

a) boric acid component: 2 to 20% by weight, c) iron salt: 2 to 20% by weight, and d) cationic polyelectrolyte: 0.1 to 3% by weight, based in each case on the solids content of the dispersion to be precipitated.

7. The process as claimed in claim 1, wherein boric acid is used as the precipitating component a), calcium hydroxide as the basic compound b), iron(III) chloride, iron(III) sulfate or iron(II) sulfate as the precipitating component c) and polydiallyldimethylammonium chloride as the cationic polyelectrolyte d), or in each case their aqueous solutions or suspensions.

* * * * *